Patented Feb. 13, 1951

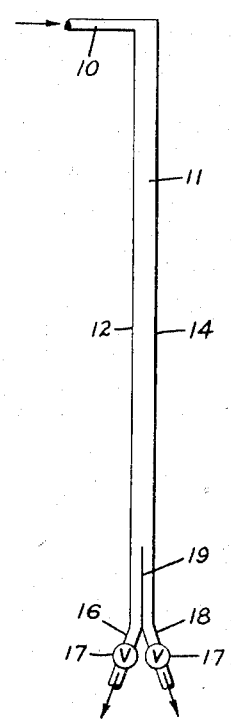
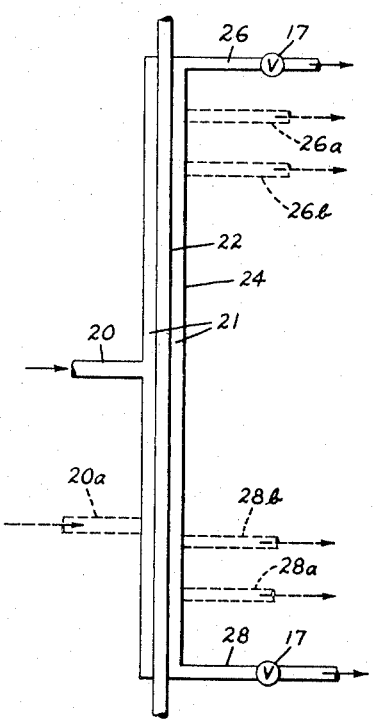
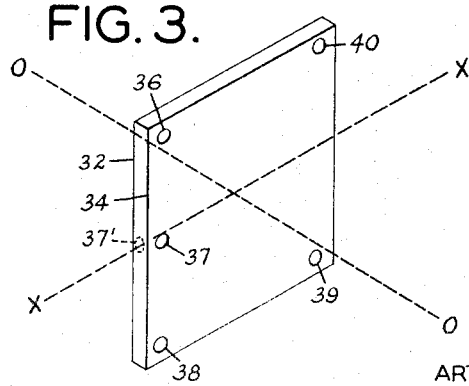

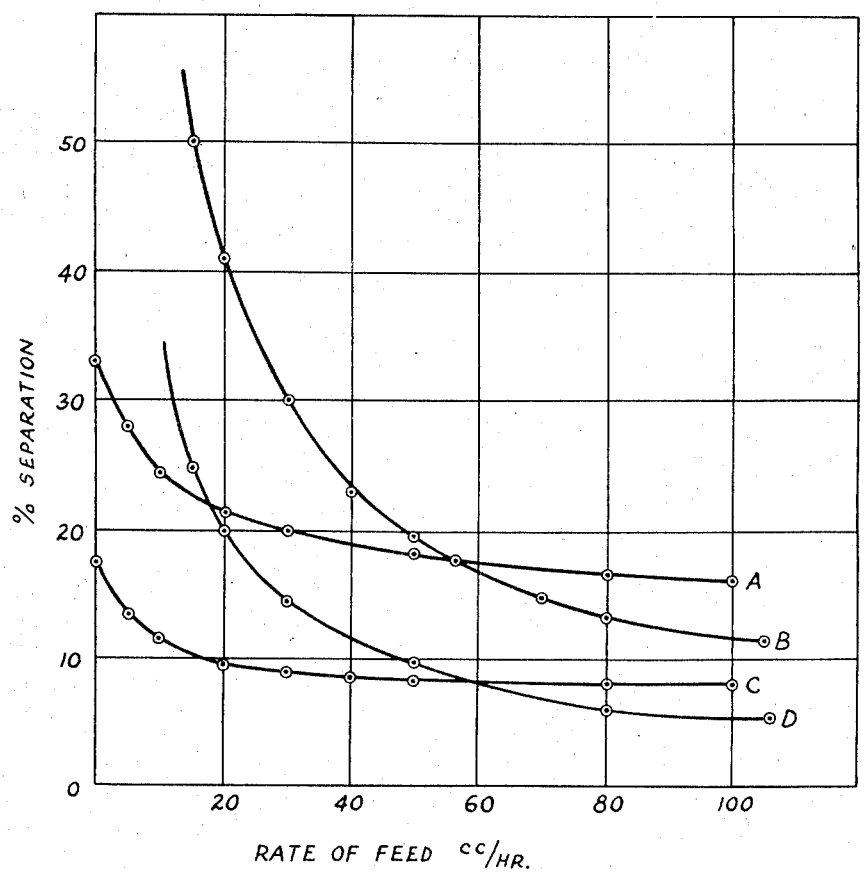

2,541,071

UNITED STATES PATENT OFFICE 2,541,071

CONTINUOUS METHOD FOR SEPARATING MATERIALS BY LIQUID THERMAL DIFFUSION

Arthur Letcher Jones, Cleveland, and Everett C. Hughes, Cleveland Heights, Ohio, assignors to The Standard Oil Company, Cleveland, Ohio, a corporation of Ohio Application July 22, 1947, Serial No. 762,746

6 Claims. (Cl. 260—97.7)

The present invention relates to a process for continuously separating dissimilar materials by thermal diffusion while the materials are in the liquid or dissolved state.

The term "dissimilar materials" is used broadly in the present specification and the appended claims and is intended to refer to two or more components of a mixture in a liquid or liquefiable state, to different materials dissolved in a common solvent as well as to a solvent and a solute. Examples of such dissimilar materials are pure oleic acid and the impurities associated therewith in a commercial form of oleic acid, an azeotropic mixture of benzyl alcohol and ethylene glycol, the active vitamins and substances not having vitamin activity dissolved in fish oil, an aqueous solution of sodium chloride, and the like.

The difference between the dissimilar materials may be extremely minute. Thus, for example, they may have the same empirical formula but differ slightly in structure or molecular weight.

The term "separation" as used hereinafter is intended to include not only separation in the ordinary sense of the word but also rectification, concentration, enrichment, and purification. Thus, for example, the "separation of dissimilar materials" includes the separation of benzyl alcohol and ethylene glycol from an azeotropic mixture of the same into two fractions, one of which is richer in benzyl alcohol and the other of which is richer in ethylene glycol than the starting mixture, the concentration or enrichment of active vitamins from a mixture of ordinarily inseparable components, one of which may have vitamin activity and the other not having such activity, the separation or concentration of antibiotics and other biological products containing the same, and the separation of vegetable and mineral oils, fats and waxes into components having different degrees of unsaturation and indexes of refraction.

It has been known for some time that it is possible to separate dissimilar materials by means of liquid thermal diffusion. The principle involved, however, is not understood with certainty and apparently no industrial use has thus far been made of the phenomenon. Apparatus known to have been devised heretofore has consisted essentially of a narrow and elongated slit in a non-horizontal position and is believed to be suitable only for a batch type process. This apparatus is completely filled with a fluid containing dissimilar components and a temperature gradient is maintained between the opposite walls of the slit for an indefinite, extended period of time. At the end of this period one end of the slit contains a higher concentration of one of the dissimilar materials than does the other end.

It will be appreciated that this batchwise method of subjecting a fluid to thermal diffusion, which is the only one known to have been proposed up to this time, is inherently nothing more than a laboratory curiosity because of the long time it takes to effect a partial separation in only a small amount of fluid, and is therefore quite unattractive for use on a commercial scale.

At the outset, liquid thermal diffusion is to be distinguished from gaseous thermal diffusion. Whereas at least one rather intricate theory has been advanced to explain gaseous thermal diffusion, no theory is believed to have been advanced in an attempt to explain liquid thermal diffusion and authorities have indicated that any satisfactory theory is practically impossible. It has been found in the development of the present invention, that theories applicable to gaseous thermal diffusion are inadequate and often misleading when applied to liquid thermal diffusion. It is therefore believed, in view of the wide difference in results obtained, as well as of the difference in inter-molecular forces, that liquid thermal diffusion involves different or additional determining factors that do not play any, or an important, part in gaseous thermal diffusion. Consequently, liquid thermal diffusion cannot be based on any knowledge available regarding gaseous thermal diffusion. For this reason, liquid and gaseous thermal diffusion must be considered as completely nonanalogous for all practical purposes.

To illustrate this difference, it may be noted that in a successful gaseous thermal diffusion the light component diffuses toward the hot surface and rises to the top of the slit and the heavy component diffuses toward the cold surface and descends to the bottom. The primary factor which permits separation of two materials by gaseous thermal diffusion, where the molecules are not in contact, is a difference in mass. In the liquid thermal diffusion, where the molecules are in contact, the mass of the molecules does not necessarily determine the direction of separation. Thus, for example, it was found that in the liquid thermal diffusion of a mixture of hexadecane and isopropyl benzene, the heavier hexadecane, having a molecular weight of 226.25, became concentrated at the top and the lighter isopropyl benzene, having a molecular weight of 120.15, became concentrated at the bottom. Perhaps still more surprising was the discovery that materials of not only the same molecular weight but of identical empirical formula, i. e., isomers of one another, such as the alpha- and beta-isomers of mono-methyl naphthalene can be separated by liquid thermal diffusion.

The method of this invention comprises continuously subjecting a liquid to thermal diffusion by forming a substantially uniform thin stream of liquid including two or more dissimilar components and maintaining a temperature gradient across said thin stream from one face of the stream to the other. This can be accomplished most expeditiously by continuously introducing the liquid into a substantially uniform narrow slit formed by two surfaces and maintaining a temperature gradient across the slit, continuously withdrawing from one part of the slit a fraction that is richer in one of the dissimilar materials than the initial liquid and continuously withdrawing from another part of the slit another fraction that is richer in the other or another of the dissimilar materials than the initial liquid.

While the present invention is not to be limited by any theory presented herein, it is believed that the phenomenon of liquid thermal diffusion may be explained on the theory that the molecules of certain materials or components acquire greater kinetic energy of translation by absorption of heat from the hot surface than do the molecules of other materials or components and that, as a result, those molecules acquiring the higher kinetic energy of translation will tend to move further away from the hot surface. If the slit is vertical or has a vertical component, a convection current is also set up in the slit so that the liquid adjacent the hot surface will rise and the liquid adjacent the cold surface will descend, with the result that the molecules having greater kinetic energy of translation imparted to them and tending to move further away from the hot surface pass downwardly next to the cold surface into the lower part of the slit whereas the other components will rise adjacent the hot surface in the slit and flow into the upper part of the slit.

It has been found, surprisingly, that under optimum conditions it is possible to obtain as great a separation of the dissimilar components or materials in one pass of the feed stock through the slit as by a number of passes as has been done in the batch method wherein the liquid subjected to thermal diffusion is allowed to arrive at a state of equilibrium. In view of this discovery the continuous method was found to be a feasible procedure. This, however, is not intended to exclude retreatment of material of different composition which is obtained after any given pass.

While it is to be understood that it is within the scope of this invention to carry out the desired separation in a horizontal slit and that it is quite possible to withdraw the dissimilar fractions therefrom without causing them to intermingle appreciably, it is preferred to operate with one or more vertical or nearly vertical slits for the reason that the mechanical difficulty of effectively withdrawing the dissimilar fractions is thereby reduced to a minimum.

The prime advantage of this method is that liquid separations hitherto considered to be impossible or impracticable by other methods, such distillation, solvent extraction, adsorption, etc., can be carried out on a commercial scale. This advantage is inherent in the method of this invention because it is continuous and avoids the necessity of carrying out separations by thermal diffusion in batches and on a small scale.

Other important advantages of this method are that it affords exact and complete control over the degree of separation or concentration that is obtained and apparently ordinary limitations relative to the finite difference between materials that can be separated or concentrated do not apply since it has been found, by experiment, that even stereo isomers having exceedingly similar physical properties can be effectively separated by this method.

These and other advantages, as well as the objects and utility of the invention, will become apparent from the more detailed description that follows hereinafter.

The continuous liquid thermal diffusion process of this inventon may be carried out in any siutable apparatus having a narrow preferably non-horizontal slit, a means for introducing the liquid to be rectified into said slit and means for withdrawing the dissimilar fractions from the slit. Apparatus of this type may be in the form of concentric tubes, parallel plates, or the like, and have a slit width of a fraction of an inch, preferably not greater than about ⅛ of an inch.

Several examples of apparatus suitable for this method are those illustrated in the accompanying drawing wherein:

Figure 1 is a diagrammatic view of one embodiment;

Figure 2 is a diagrammatic view of an embodiment wherein the slit is formed by a pair of concentrically disposed tubes;

Figure 3 is a diagrammatic view of an arrangement wherein a slit formed by a pair of parallel plates is provided with a number of inlet and outlet ports; and Figure 4 is a graph illustrating the relation between the degree of separation, the rate of feed of the initial liquid, and the length and width of the slit.

The method illustrated schematically in Fig. 1 of the drawing involves introducing the initial liquid through an inlet port 10 into a narrow slit 11 formed by two separated surfaces 12 and 14, one of which is maintained at a higher temperature level than the other. The resultant temperature gradient across the slit 11 causes thermal diffusion to take place in the liquid within the slit so that the portion adjacent the hot surface of the slit, i. e., the portion lying between the hot surface and approximately the center of the slit, becomes more concentrated in one of the dissimilar materials and the other portion adjacent the cold surface of the slit, i. e., the portion between the cold surface and the center of the slit, becomes more concentrated in another of the dissimilar materials of the initial liquid. The portion of the thermally diffused liquid adjacent surface 12 is withdrawn continuously through an outlet port 16 provided with a regulating valve 17 and the portion adjacent surface 14 is continuously withdrawn through an outlet port 18 likewise provided with a regulating valve 17. If desired, a partition 19 in the center of the slit 11 may be provided at the bottom of the slit to avoid local turbulence and possible intermingling of the dissimilar fractions shortly before they are withdrawn from the slit 11.

While the embodiment of the method described with reference to Figure 1 is quite feasible and is to be preferred when the slit is in a horizontal or nearly horizontal position, it is generally advantageous, in industrial application, to carry out the liquid thermal diffusion in vertical or nearly vertical slits such as are illustrated by way of example in Figures 2 and 3 wherein the dissimilar fractions are removed from the top and bottom of the slit. The advantage of utilizing a substantially vertical slit is believed to be due to the fact that the convection currents set up in such a slit facilitates the separation of the dissimilar fractions formed by the thermal diffusion phenomenon.

The method illustrated by way of example in Figure 2 includes introducing the liquid to be subjected to thermal diffusion through an inlet port 20 into a narrow and substantially vertical slit 21 formed by two concentrically disposed tubes 22 and 24, the surface of one of said tubes being maintained at a higher temperature than that of the other. The resultant temperature gradient across the slit 21 causes thermal diffusion to take place within the slit so as to concentrate one of the dissimilar materials adjacent the hot surface and to concentrate another of the dissimilar materials adjacent the cold surface in the same manner as described with reference to Fig. 1. The temperature gradient also results in a convection current within the slit 21 whereby the material adjacent the hot surface rises to the top and the material adjacent the cold surface descends to the bottom of the slit. The material that tends to concentrate adjacent to the hot surface of the slit and therefore rises to the top is continuously withdrawn through an outlet port 26 provided with a regulating valve 17, and the material that tends to concentrate adjacent the cold surface and descends to the bottom of the slit is continuously withdrawn through an outlet port 28, likewise provided with a regulating valve 17.

If desired, the inlet port need not be positioned midway between the two outlet ports but may be placed in a quarter position such as that shown in dotted lines at 20a. Furthermore, the slit 21 may be provided with a number of inlet ports, such as 20 and 20a, so that the initial liquid can be introduced into the slit at any point at the will of the operator and a number of additional outlet ports, such as at 26a, 26b, 28a and 28b to permit the withdrawal of fractions of different concentrations.

The apparatus illustrated diagrammatically in Fig. 3 includes a slit similar to slit 11 illustrated in Fig. 1 formed by the separated surfaces of a pair of plates 32 and 34, one or both of said plates being provided with a suitable number of ports, such as ports 36, 37, 38, 39 and 40. The interior surfaces of plates 32 and 34 are maintained at different temperature levels to provide a temperature gradient across the slit. Plates 32 and 34 may be tilted about the horizontal XX axis so long as the slit does not become completely horizontal. If the liquid to be subjected to thermal diffusion is introduced into the slit while it is tilted about the X—X axis, the upper surface of the slit should be maintained at a higher temperature than the lower surface so that the convection current created by the temperature differential will not interfere with the thermal diffusion process. Plates 32 and 34 may also be tilted about the horizontal O—O axis so that one corner of the plates will be higher and the opposite corner will be lower than the remaining portions.

When the apparatus is in the position shown in Fig. 3, i. e., when ports 36 and 40 are on the same level, the liquid to be subjected to thermal diffusion may be introduced through port 36 and the dissimilar fractions may be withdrawn from ports 40 and 39 or 40 and 38. If plate 32 is likewise provided with ports disposed oppositely to ports 38 and 39, the dissimilar fractions may also be withdrawn through port 38 or 39 and the port or ports opposite them in plate 32.

If the initial liquid is introduced in to the slit by way of port 37, the top and bottom fractions may be withdrawn through ports 40 and 39, respectively, or through any other combination of ports so long as one of the ports is higher and the other is lower than port 37. If the initial liquid is introduced through port 38, the hot fraction may be withdrawn through ports 36 or 40 and the cold fraction may be withdrawn through port 39.

If the plates are rotated on the O—O axis until port 36 is higher and port 39 is lower than all of the other ports, the initial liquid may be introduced through ports 38 and/or 40, the top fraction may be withdrawn through port 36 or 37 and the bottom fraction may be withdrawn through port 39. It is likewise possible to introduce the initial liquid through port 37 and to withdraw the top and bottom fractions through ports 36 and 39, respectively. Furthermore, if port 39 is duplicated on the opposite side of the slit in plate 32, the initial liquid may be introduced through port 36 and the fractions adjacent the hot and cold surfaces may be withdrawn through port 39 and said oppositely disposed port.

It is within the contemplation of this invention relative to the arrangement illustrated by way of example in Fig. 3 to locate the various ports in such a manner that they are in line with the slit rather than at right angles to it. In this event, the port 37 would be replaced by a port 37' as shown in dotted lines and the remaining ports would be similarly replaced. Any oppositely disposed ports, i. e., opposite one another on opposed plates, could be replaced by an arrangement similar to that illustrated diagrammatically in the lower portion of Fig. 1.

In carrying out the method of this invention, it is necessary only, as far as the location of the feed is concerned, to make certain that the initial liquid will not be withdrawn from the slit before being subjected to thermal diffusion. This may be accomplished by feeding the initial liquid into the slit and withdrawing the fractions adjacent the hot and cold surfaces in any of the various ways described with reference to Figs. 1 to 3.

Any suitable means may be employed to maintain a temperature gradient across the slit. The walls forming the surfaces of the slit are constructed of any solid material and are capable of conducting heat to or from heating or cooling jackets provided to maintain said surfaces at the desired temperatures. Examples are glass and metals such as steel, brass and aluminum. Any source of heat appropriate to the temperature that is maintained at the hot surface may be utilized. Among these are the condensing vapors of steam or other liquids of known boiling points at atmospheric or other pressure, electric heating devices and hot circulating liquids. Similarly, conventional cooling methods may also be employed to keep the temperature of the cold surface at the desired level. Among such methods are air cooling, liquid circulation, vaporizing liquid systems, and other conventional refrigerating means.

It is to be understood that the terms "hot" and

"cold" as applied to the slit surfaces, and "heating" and "cooling," as applied to the temperature controlling media, are used in their relative rather than their absolute sense. Thus, for example, the hot and cold surfaces of a slit may be maintained at temperatures of say 160° C. and 100° C., respectively, or, if the boiling point of the liquid to be subjected to thermal diffusion is low, at temperatures of say 0° C. and —35° C., respectively. The heating media, in such instances, may be steam under pressure, diphenyl vapors, or a boiling mixture of water and ethylene glycol, or it may be ice water. The cooling media, in the examples given, may be a vaporizing liquid, such as ammonia or boiling water.

The more important variables of the method of this invention are the temperature level of the operation, i. e., the mean between the temperatures of the hot and cold surfaces, particularly in relation to the viscosity and boiling point of the liquid to be subjected to thermal diffusion, and the rate of feed of the liquid through the slit. Other variables in the method are the composition of the liquid to be subjected to thermal diffusion, boiling point, temperature of decomposition, freezing or congealing temperature, and difficulty of separation into its dissimilar materials, the magnitude of the temperature gradient, the degree of separation desired, the ratio of the rates of withdrawal of the two fractions, and the pressure employed in the operation.

These variables, which are interdependent for the most part, are also dependent upon the following additional variable factors in the apparatus used to carry out the liquid thermal diffusion: the slit width, i. e., the distance between the hot and cold surfaces of the slit; the slit length, i. e., the effective length of the thermal diffusion section across which a temperature gradient is maintained, the surface area of each slit, i. e., the sum of the products of the length and (in the tube type apparatus) the outside and inside circumferences of the inner and outer tubes, respectively, or (in the plate type apparatus) the lateral extent of each surface of the slit; and the position of the inlet port or feed relative to the take-off ports.

The effect these variables have upon one another can readily be determined by one skilled in the art in view of the following general criteria and specific data.

The temperature level of the operation depends primarily upon the composition of the liquid and the temperature and pressure at which the liquid is stable and remains in the liquid phase.

Generally, it may be stated that the temperature level of the operation should be such as to reduce the viscosity of the liquid to a minimum without disrupting the laminar flow of the liquid or its components along the surfaces of the slit. The temperature level should also be maintained low enough so as not to reach the boiling point of the liquid at the pressure of the operation, nor should it reach the temperature of decomposition of the liquid or any of its components. By the same token, the temperature level should be maintained high enough so as to maintain the liquid to be subjected to thermal diffusion in the liquid state at the pressure of the operation. In addition, the temperature level must be so chosen as to allow both a higher and a lower temperature within the slit to provide a temperature gradient that will likewise not cause the liquid or any component thereof to boil, decompose, freeze or congeal.

The rate at which the liquid to be subjected to thermal diffusion can be fed into a slit depends upon the composition of the liquid, particularly in relation to its difficulty of separation into dissimilar materials, the temperature level, the degree of separation desired, the magnitude of the temperature gradient across the slit, and the slit width and length.

The rate of feed is dependent more or less directly upon the difficulty with which the dissimilar materials are separated and, all other factors being constant, must be decreased in proportion to increasing difficulty of separation.

The maximum rate of feed should not exceed that at which turbulence will begin to take place within the slit, and this in turn is dependent upon the viscosity of the liquid at the temperature level of the operation and the magnitude of the temperature gradient since these are the factors that determine the speed of the convective flow within the slit and the frictional resistance to the countercurrent flow at the interface.

An increase in the rate of feed results in a decrease in the degree of separation obtained, and vice versa, all other factors being constant, and is more or less directly proportional to the magnitude of the temperature gradient and to the effective length of the slit. Thus, for example, to obtain a given degree of separation in any particular liquid, the rate of feed may be increased proportionally with an increase in either the magnitude of the temperature gradient or in the effective length of the slit.

The width of the slit, i. e., the distance between the hot and cold surfaces, is generally not greater than about ⅛ of an inch for practical lengths. At greater lengths the slit could be larger. Slit widths within the range of 0.020 to 0.060 inch are preferred for columns of practical lengths. At slit widths below and above this, under given temperature conditions and at optimum feed rates, the degree of separation falls off.

Generally, the rate of feed may be increased with an increase in slit width since there is less likelihood of turbulence, at a given rate of flow, in a wide slit than there is in a narrow slit. The table below gives optimum rates of flow for given ranges of slit width of a column 24 feet long and one inch mean slit diameter:

*Table I*

| Optimum Rate of Flow (cc./hr.) | Slit-Width Ranges (inches) |
|---|---|
| 10 | 0.030-0.035 |
| 20 | 0.032-0.040 |
| 40 | 0.375-0.047 |
| 60 | 0.040-0.050 |
| 100 | 0.042-0.0505 |
| 130 | 0.042-0.051 |

Specifically, however, it was found in the development of this invention, that at low rates of feed greater separations of the dissimilar materials were obtained in narrower slits than in wider slits and that at higher rates of feed greater separations were obtained in wider slits than in narrower slits. In Fig. 4 of the drawings, the results of tests conducted along this line are reproduced. The liquid subjected to thermal diffusion, the temperature gradient, and the temperature level were all maintained constant. Curves A and B show the results obtained in slits having widths of 0.047 and 0.031 inch, respectively, each slit having a length of eight feet, and curves C and D show the results obtained in slits likewise having widths of 0.047 and 0.031 inch, respectively, each slit having a length of four feet.

The magnitude of the temperature gradient employed depends primarily upon the rate of feed, the degree of separation desired and the composition of the liquid to be subjected to thermal diffusion, particularly in relation to its boiling point, freezing point, decomposition temperature, and the difficulty of separating the dissimilar components.

As stated previously, the magnitude of the temperature gradient for a given liquid is more or less directly proportional to the rate of feed. All other variables remaining constant, the magnitude of the temperature differential is limited mainly by the turbulence it induces, since it is desirable at all times to maintain a laminar flow of the liquids along the hot and cold walls. The lower limit of the temperature gradient is limited only by the minimum rate of feed that is acceptable to the operator because even with a temperature gradient of as little as 1° F., a separation will take place provided the rate of feed is low enough. In the development of this invention, it has been found that temperature gradients of between 50° and 75° C., while not critical, give excellent results at acceptable rates of feed.

For a given rate of feed, the degree of separation increases with an increasing temperature gradient possibly because the difference in kinetic energy acquired by the molecules of the dissimilar materials is proportional to the difference between the temperatures of the hot and cold surfaces, or possibly because the increased temperature gradient increases the rate of thermal circulation within the slit.

The magnitude of the temperature gradient employed in subjecting any particular material to thermal diffusion is limited by the difference between the boiling and freezing or congealing temperatures as well as by the variations in viscosity of the liquid at various temperatures. Where the boiling and freezing temperatures of a liquid are far apart, the temperature gradient across the slit may be correspondingly great; similarly, where the viscosity of the liquid does not change appreciably over a considerable temperature difference, the temperature gradient across the slit may likewise be correspondingly great.

It is to be understood, of course, that when it is desired to separate vitamins, antibiotics, or other biological products, the extreme temperatures of the temperature gradient should not be such as to deactivate, injure, kill or otherwise affect deleteriously the materials sought to be separated.

The ratio of the rates at which the top and bottom fractions are withdrawn from the slit, while not as critical as most of the variable factors already discussed, is dependent upon the degree of separation desired, the composition of the initial liquid and the position of the inlet feed.

Where it is found that the material sought to be concentrated is concentrated in the top fraction and it is desired to increase the degree of concentration obtained by one pass through a slit, some increase in the rate of concentration can be obtained by withdrawing the bottom fraction at a greater rate than the top fraction. If the material sought to be concentrated becomes concentrated in the bottom fraction, the same result will be obtained by withdrawing the top fraction at a greater rate than the bottom fraction.

Where the initial liquid is difficult to separate and the material sought to be concentrated is present in small quantities, some advantage may be obtained by withdrawing the fraction containing an increased concentration of the desired material at a rate that is slower than the rate at which the other fraction is withdrawn.

The optimum rate of withdrawal also varies somewhat with the position of the feed between the points of withdrawal. A series of tests was carried out with a slit having a length of five feet and a width of 0.031 inch. Outlet ports were located at both ends of the slit, one inlet port was located in the center of the column and another inlet port (referred to as the "quarter feed position"), was located midway between the first inlet port and the bottom takeoff port. A temperature gradient of about 80°–90° C. was maintained in the slit by the use of steam and tap water. The results are listed in the table below:

*Table II*

| | Mixture (proportion by volume of hexadecane to monomethyl naphthalene) | Feed Position | Take-off Ratio (top to bottom) | Feed Rate (cc./hr.) | Composition of— | |
|---|---|---|---|---|---|---|
| | | | | | Top Fraction (proportion by volume of hexadecane to monomethyl naphthalene) | Bottom Fraction (proportion by volume of hexadecane to monomethyl naphthalene) |
| 1 | 75:25 | quarter | 3:1 | 20 | 80.5:19.5 | 60.5:39.5 |
| 2 | 75:25 | do | 1:1 | 20 | 85.5:14.5 | 66.5:33.5 |
| 3 | 75:25 | center | 3:1 | 20 | 81.5:18.5 | 61.5:38.5 |
| 4 | 75:25 | do | 1:1 | 20 | 84.5:15.5 | 68.0:32.0 |
| 5 | 50:50 | quarter | 3:1 | 22 | 66.0:34.0 | 28.5:71.5 |
| 6 | 50:50 | do | 1:1 | 20 | 70.5:29.5 | 41.5:58.5 |
| 7 | 50:50 | center | 3:1 | 20 | 66.0:34.0 | 28.0:72.0 |
| 8 | 50:50 | do | 1:1 | 20 | 71.0:29.0 | 37.5:62.5 |
| 9 | 52.5:47.5 | quarter | 3:1 | 114 | 54.0:46.0 | 49.5:50.5 |
| 10 | 52.5:47.5 | do | 1:3 | 102 | 58.0:42.0 | 51.5:48.5 |
| 11 | 52.5:47.5 | center | 3:1 | 102 | 56.5:43.5 | 44.0:56.0 |
| 12 | 52.5:47.5 | do | 1:3 | 108 | 62.0:38.0 | 50.5:49.5 |

From this the conclusion was drawn that the position of the feed makes some, but not very much difference in the degree of the separation obtained and that with a constant feed rate, the degree of separation at either end of the slit is dependent upon the ratio at which the fractions are withdrawn, the degree of concentration of a component being an inverse function of the rate at which the fraction containing the increased concentration of said component is removed.

A great many varieties of liquids have been subjected to thermal diffusion in developing the present invention, and the results have been quite surprising. Monomethyl naphthalene resulted in a top fraction of the beta isomer and in a bottom fraction of the alpha isomer. 1,2-dimethyl cyclohexane was split into a top fraction containing a greater concentration of the trans-stereo isomer and a bottom fraction containing a greater concentration of the cis-stereo isomer. A mixture of ortho and para-xylene was resolved into a top fraction of para-xylene and a bottom fraction of ortho-xylene. Castor oil was resolved into a top fraction of lighter color, less acid, lower viscosity, more odor, and lower refractive index and a bottom fraction having darker color, more acid, higher viscosity, no odor, and a higher refractive index. Commercial oleic acid was resolved into a top fraction having a lighter color, more odor, and a lower viscosity and a bottom fraction having more color, no odor, and a higher viscosity.

The bottom cuts are generally more viscous and darkly colored. When tall oil, castor oil and oleic acid are subjected to liquid thermal diffusion, there is a noticeable difference in the odor of the top and bottom fractions, the bottom fractions being practically odorless and the top fractions being noticeably more odoriferous than the feed stock. This probably indicates that the odor is not a function of the main body of the liquid but is probably due to the presence of some different component in small amounts. It is believed that liquid thermal diffusion may be applied to the purification and separation of a wide variety of materials.

Without intending to limit in any way the scope of the invention, but merely to illustrate more specifically the operation and utility of the method herein described, the following examples are included:

Example 1

An azeotropic mixture consisting of 56% ethylene glycol and 44% benzyl alcohol that could not be rectified by distillation was introduced at a rate of 10 cc. per hour into a vertical slit formed by two spaced brass plates the slit having a width of 0.031 inch, a length of five feet and a surface area of 1.25 square feet and the inlet feed being located midway between the top and bottom ends of the slit. One surface was maintained at a temperature of 20° C. by cooling it with tap water and the other wall was maintained at 100° C. by means of steam at atmospheric pressure. The fractions from the two ends of the slit were removed at equal rates.

It was found that after only a single pass through this slit the degree of separation obtained was 29% of that theoretically possible.

Example 2

Crude menhaden fish oil was introduced at a rate of 5 cc. per hour into a vertical annular slit formed by the walls of two concentric glass tubes. The slit had a width of 0.047 inch, a length of eight feet and a surface area of two square feet. One surface of the slit was maintained at a temperature of 100° C. by means of steam at atmospheric pressure and the other surface was maintained at approximately 20° C. by the circulation of tap water. The initial fish oil was introduced into the slit midway between the two ends and the fractions from the top and bottom of the slit were removed at equal rates.

A colorimetric method of evaluating the concentration of vitamin A in the fish oil, utilizing $SbCl_3$ in $CHCl_3$, was applied to the fractions and to the initial fish oil, the vitamin A producing a blue color with said reagent. The optical densities of the colored solutions produced by this test were measured in a Duboscq colorimeter.

The results of a single pass of the fish oil through the slit were as follows:

|  | $N_D^{20}$ | O.D./g. |
|---|---|---|
| Initial Menhaden Oil | 1.4791 | 15.4 |
| Top Fraction | 1.4789 | 12.6 |
| Bottom Fraction | 1.4800 | 22.4 |

Example 3

Corn oil was introduced at a rate of 5 cc. per hour midway between the ends of the slit described in Example 2, the temperatures of the hot and cold surfaces being maintained at 100° C. and about 20° C., respectively, and the top and bottom fractions being withdrawn at equal rates.

The results of a single pass of the corn oil through the slit were as follows:

|  | $N_D^{20}$ | Iodine No. |
|---|---|---|
| Initial Corn Oil | 1.4728 | 126.5 |
| Top Fraction | 1.4720 | 120.2 |
| Bottom Fraction | 1.4720 | 128.3 |

Example 4

Tall oil was introduced at a rate of 5 cc. per hour into the slit described in Example 2 midway between the ends, the hot and cold surfaces of the slit being maintained at 100° C. and about 20° C., respectively, and the top and bottom fractions being withdrawn at equal rates.

The results of a single pass of the tall oil through the slit were as follows:

|  | $N_D^{20}$ | Iodine No. |
|---|---|---|
| Initial Tall Oil | 1.4943 | 141.5 |
| Top Fraction | 1.4817 | 149.6 |
| Bottom Fraction | 1.513 | 126.3 |

Example 5

Tall oil consisting of ⅓ by volume of rosin acids and ⅔ by volume of fatty acids was introduced at a rate of 5 cc. per hour into the eight foot slit described in Example 2, the hot surfaces of the slit being maintained at 100° C. and the cold surface being maintained at 20° C. During the first pass, the top fraction was withdrawn at twice the rate of the bottom fraction. The bottom fraction was found to be a thick, dark syrup from which the rosin acids precipitate on standing. The composition of the top fraction was determined to be:

| | Percent |
|---|---|
| Free fatty acids | 77 |
| Rosin acids | 17 |
| Unsaponifiables | 6 |

The top fraction from the first pass was then introduced at the same rate into a second slit similar to the first and the top and bottom fractions on this second pass were withdrawn at a ratio of 3 to 2. The top fraction from the second pass was found to be an oil, very light in color and almost odorless, from which a greasy solid precipitates on standing. The composition of this top fraction was determined to be:

| | Percent |
|---|---|
| Free fatty acids | 92.0 |
| Rosin acids | 2.3 |
| Unsaponifiables | 5.2 |

The white solid which separates from this fraction appears to be a mixture of saturated fatty acids such as stearic and palmitic. A good soap was prepared from this fraction.

The bottom fraction from the second pass was found to be a dark, heavy oil consisting of some rosin acids but largely of unsaturated fatty acids having an iodine number of 160. A good drying oil was prepared from this fraction, the composition of which was determined to be:

| | Percent |
|---|---|
| Free fatty acids (unsaturated) | 53 |
| Rosin acids | 34 |
| Unsaponifiables | 13 |

The three fractions described in this example were obtained in the following proportions with respect to the initial feed stock:

| | Percent |
|---|---|
| First bottom fraction | 33 |
| Second top fraction | 40 |
| Second bottom fraction | 27 |

Example 6

A lubricating petroleum oil stock having a viscosity of 300 SUS and 100° F. and an $N_D^{20}$ of 1.5025, referred to by the trade name #300 Red oil, was introduced at various rates into a tubular slit formed by a pair of concentric tubes as illustrated diagrammatically in Fig. 2 of the drawing and having a width of 0.031 inch, a length of six feet and a surface area of 3.5 square feet.

The outer tube was surrounded by a third tube to form a heating jacket and a resistance wire was wound spirally around the outside of said jacket. The Red oil was passed through said heating jacket and fed into the slit midway between the ends through a number of small feed holes in the tube forming the outer surface of the slit, the Red oil thus being preheated and at the same time serving as a conductor of the heat from the resistance wire to the hot surface of the slit. The temperature of the hot surface was maintained at between 150° and 165° C. and the cold surface was maintained at a temperature of about 115° C. by passing through the interior of the innermost tube a mixture of water and ethylene glycol boiling at that temperature. The results obtained are tabulated below:

| Rate of Feed (cc. per hour) | Change in Index of Refraction between Top and Bottom Fractions |
|---|---|
| 132 | .0051 |
| 112 | .0059 |
| 80 | .0080 |
| 60 | .0102 |
| 48 | .0125 |
| 29 | .0182 |
| 18 | .0240 |

The term "optical density," as used in the present disclosure, represents the standard logarithmic ratio of intensity of an incident ray falling on a transparent or translucent medium to the intensity of the transmitted ray for a sample length of one meter and light of wave length from 5100 to 5500 Angstroms.

It is to be understood that the method of the present invention is susceptible of innumerable variations and modifications that will readily occur to those skilled in the art upon reading the present description. All such variations and modifications are intended to be included within the scope of this invention as defined in the appended claims. Co-pending application Serial No. 753,200, filed June 7, 1947, describes and claims apparatus suitable for use in practicing the process claimed in this specification. Co-pending application Serial No. 765,350, filed July 11, 1947, describes and claims a method similar to the method here claimed but directed more particularly to the treatment of petroleum products.

We claim:

1. In a process for continuously separating, by thermal diffusion, two fractions containing dissimilar materials that are normally liquid under the conditions of separation and which are included in a material normally liquid under the conditions of separation, the improvement which comprises subjecting said liquid to continuous thermal diffusion by continuously moving said liquid in the form of a substantially uniform vertical stream having a thickness of between 0.02 and about 0.06 inch, which stream is defined by stationary smooth walls and across which is maintained a temperature gradient over the entire range of which the material and the fractions therein are liquid, continuously removing from one part of said stream, at a significant rate, a liquid fraction containing a greater concentration of one of said dissimilar materials than was contained in the initial liquid, and continuously removing from another part of said stream a second liquid fraction containing a greater concentration of another of said dissimilar materials than was contained in the initial liquid.

2. The process of claim 1 in which the normally liquid material treated is castor oil.

3. The process of claim 1 in which the normally liquid material treated is oleic acid.

4. The process of claim 1 in which the normally liquid material treated is a mixture of ethylene glycol and benzyl alcohol.

5. The process of claim 1 in which the normally liquid material treated is fish oil.

6. The process of claim 1 in which the normally liquid material treated is tall oil.

ARTHUR LETCHER JONES.
EVERETT C. HUGHES.

REFERENCES CITED

The following references are of record in the file of this patent:

UNITED STATES PATENTS

| Number | Name | Date |
|---|---|---|
| 2,158,238 | Hvid | May 16, 1939 |
| 2,258,594 | Brewer et al. | Oct. 14, 1941 |
| 2,268,134 | Clusius | Dec. 30, 1941 |
| 2,390,115 | McNitt | Dec. 4, 1945 |

FOREIGN PATENTS

| Number | Country | Date |
|---|---|---|
| 509,618 | Great Britain | July 19, 1939 |
| 738,812 | Germany | Sept. 2, 1943 |

OTHER REFERENCES

Berichte, vol. 73, pages 249–269.

Certificate of Correction

Patent No. 2,541,071                                                           February 13, 1951

ARTHUR LETCHER JONES ET AL.

It is hereby certified that error appears in the printed specification of the above numbered patent requiring correction as follows:

Column 3, line 72, before the word "distillation" insert *as*; column 5, line 15, after "vertical" insert *tubular*; column 14, line 15, for the serial number "765,350" read *760,350*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*